(No Model.)
M. BRAY.
METHOD OF MAKING TUBULAR RIVETS.
No. 328,757. Patented Oct. 20, 1885.
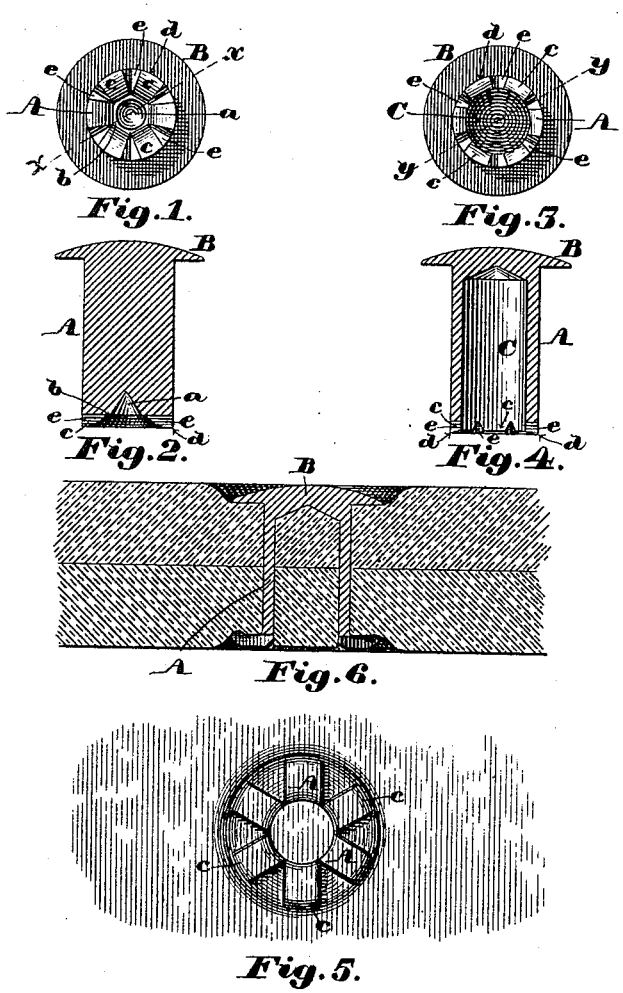
Witnesses:
Walter E. Lombard.
Frank E. Bray.
Inventor:
Mellen Bray,
by N. C. Lombard
Attorney.

UNITED STATES PATENT OFFICE.

MELLEN BRAY, OF NEWTON, MASSACHUSETTS.

METHOD OF MAKING TUBULAR RIVETS.

SPECIFICATION forming part of Letters Patent No. 328,757, dated October 20, 1885.

Application filed April 29, 1885. Serial No. 163,807. (No model.)

*To all whom it may concern:*

Be it known that I, MELLEN BRAY, of Newton, in the county of Middlesex and State of Masssachusetts, have invented certain new and useful Improvements in Rivets, of which the following, taken in connection with the accompanying drawings, is a specification—

My invention relates to the manufacture of rivets; and has for its object the production from a solid cylindrical body of a rivet having a tubular shank scored or notched radially to facilitate the clinching of the rivet by causing said shank to split into as many equal parts as there are notches formed in the end of said tube; and it consists, first, in the method of forming scored-ended tubular rivets by first forming on the end of the shank of a solid rivet a knife-edged annulus divided into segments by a series of radial grooves and a central conical recess extending into said shank beyond the bottoms of said grooves, and then drilling out the center of said shank to form a tube.

It further consists in the method of forming scored-ended tubular rivets by first forming on the end of the shank of a solid rivet a series of segments, of a knife-edged annulus separated by radial grooves, a central conical recess extending into said shank beyond the bottoms of said grooves, and an annular flat surface between said recess and segments, and then drilling out the center of said shank to form a tube.

Of the drawings, Figure 1 represents an inverted plan of my improved solid rivet or blank. Fig. 2 represents a central vertical section of the same, the cutting plane being on line *x x* on Fig. 1. Fig. 3 represents an inverted plan of a tubular rivet formed from said blank by simply drilling out its shank. Fig. 4 represents a central vertical section of the same, the cutting plane being on line *y y* on Fig. 3. Fig. 5 represents an inverted plan of one of the tubular rivets set in two pieces of leather, and Fig. 6 represents a central vertical section of the same.

In the drawings, A is the shank of a solid rivet or blank, and B is its head, which bears upon and clamps the leather or other material when the rivet is set therein. The end of the shank opposite the head is provided with a conical recess, *a*, the center of which coincides with the center of the said shank. Around this recess *a* and at a short distance from the end of the shank opposite to the head B is formed a flat surface, *b*, around which is formed upon said shank A a series of sections, *c c*, of an annular ring of metal triangular in cross-section, having one of its sides a continuation of the outer surface of the shank A and one of its angles at the outermost end of said shank, so as to form thereon a cutting-edge, *d*, said sections being separated from each other by a series of V-shaped radial grooves, *e e*, as shown in Fig. 2. These solid rivets so prepared are converted into scored-ended tubular rivets by drilling out their shanks, said conical recesses serving to center and steady the drill until it has fairly got at work, the flat surface *b* allowing the drill to get some headway within the shank A before coming into contact with the ring-sections *c*, thus preventing the chattering or breakage of the drill in the process of drilling, which would be liable to be the case if such a flat surface *b* were not provided.

The hole C being drilled in the shank A, a rivet is formed, substantially as represented in Figs. 3 and 4, which, when set in one or more pieces of leather or similar material, will split along its sides in as many places as there are notches *e e* formed upon the cutting-edge *d*. These separate sections into which the tube is split will be upset in the process of setting the rivet, and will firmly clinch the leather or other material between themselves and the head B of the rivet in an obvious manner.

What I claim as new, and desire to secure by Letters Patent of the United States, is—

1. The method of producing scored-ended tubular rivets, which consists in first forming on the end of the shank of a solid rivet a knife-edged annulus divided into segments by radial grooves and a central conical recess extending into said shank beyond the bottoms of said grooves, and then drilling out the center of said shank to form a tube, substantially as described.

2. The method of producing scored-ended tubular rivets, which consists in first forming on the end of the shank of a solid rivet a series of segments of a knife-edged annulus separated by radial grooves, a central conical recess extending into said shank beyond the bottoms of said grooves, and an annular flat surface between said recess and said segments, and then drilling out the center of said shank to form a tube, substantially as described.

In testimony whereof I have signed my name to this specification, in the presence of two subscribing witnesses, on this 27th day of April, A. D. 1885.

MELLEN BRAY.

Witnesses:
WALTER E. LOMBARD,
FRANK E. BRAY.